US012695887B2

(12) United States Patent
Huang et al.

(10) Patent No.: US 12,695,887 B2
(45) Date of Patent: Jul. 28, 2026

(54) METHOD, APPARATUS, AND MEDIUM FOR VIDEO PROCESSING

(71) Applicants:Beijing Bytedance Network Technology Co., Ltd., Beijing (CN); Bytedance Inc., Los Angeles, CA (US)

(72) Inventors: Yan Huang, Beijing (CN); Jizheng Xu, Los Angeles, CA (US); Li Zhang, Los Angeles, CA (US); Li Song, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 70 days.

(21) Appl. No.: 18/418,037

(22) Filed: Jan. 19, 2024

(65) Prior Publication Data

US 2024/0195986 A1 Jun. 13, 2024

Related U.S. Application Data

(63) Continuation of application No. PCT/CN2022/110363, filed on Aug. 4, 2022.

(30) Foreign Application Priority Data

Aug. 5, 2021 (WO) ................ PCT/CN2021/110699

(51) Int. Cl.
*H04N 19/119* (2014.01)
*G06V 10/74* (2022.01)
(Continued)

(52) U.S. Cl.
CPC ......... *H04N 19/176* (2014.11); *G06V 10/761* (2022.01); *H04N 19/119* (2014.11); *H04N 19/159* (2014.11); *H04N 19/96* (2014.11)

(58) Field of Classification Search
None
See application file for complete search history.

(56) References Cited

U.S. PATENT DOCUMENTS

| 2011/0051801 A1* | 3/2011 | Hwang | H04N 19/107 |
| | | | 375/E7.026 |
| 2022/0256169 A1* | 8/2022 | Siddaramanna | G06N 3/045 |
| 2023/0144483 A1* | 5/2023 | Wang | H04N 19/114 |
| | | | 375/240.02 |

FOREIGN PATENT DOCUMENTS

| CN | 110166771 A | 8/2019 |
| CN | 111107344 A | 5/2020 |

(Continued)

OTHER PUBLICATIONS

Chen et al., "BoG report on CE4 inter prediction with merge modifications," Joint Video Experts Team (JVET) of ITU-T SG 16 WP 3 and ISO/IEC JTC 1/SC 29/WG 11, 15th Meeting: Gothenburg, SE, Jul. 3-17, 2019, Document JVET-O1039-v5, 41 pages.
(Continued)

*Primary Examiner* — Samuel D Fereja
(74) *Attorney, Agent, or Firm* — Astute IP Law Group

(57) ABSTRACT

Embodiments of the present disclosure provide a solution for video processing. A method for video processing is proposed. The method comprises: determining, during a conversion between a target video block of a video and a bitstream of the video, a prediction of coding time for the target video block, the coding time representing a time duration during which a coding process of the target video block being performed; adjusting the coding process for the target video block based at least in part on the prediction of coding time; and performing the conversion between the target video block and the bitstream by using the adjusted coding process.

19 Claims, 13 Drawing Sheets

1200

1202
DETERMINE, DURING A CONVERSION BETWEEN A TARGET VIDEO BLOCK OF A VIDEO AND A BITSTREAM OF THE VIDEO, A PREDICTION OF CODING TIME FOR THE TARGET VIDEO BLOCK

1204
ADJUST A CODING PROCESS FOR THE TARGET VIDEO BLOCK BASED AT LEAST IN PART ON THE PREDICTION OF CODING TIME

1206
PERFORM THE CONVERSION BY USING THE ADJUSTED CODING PROCESS

(51)  Int. Cl.
    *H04N 19/159*         (2014.01)
    *H04N 19/176*         (2014.01)
    *H04N 19/96*          (2014.01)

(56)            References Cited

FOREIGN PATENT DOCUMENTS

| | | |
|---|---|---|
| CN | 113132728 A | 7/2021 |
| WO | 2017096947 A1 | 6/2017 |
| WO | 2018166535 A1 | 9/2018 |

OTHER PUBLICATIONS

International Search Report in in PCT/CN2022/110363, mailed Nov. 2, 2022, 4 pages.

* cited by examiner

600 —

Calibration types:

Default unaccelerated CTU

Fixed interval calibration CTU

Error resistant calibration CTU

DETERMINE, DURING A CONVERSION BETWEEN A TARGET VIDEO BLOCK OF A VIDEO AND A BITSTREAM OF THE VIDEO, A PREDICTION OF CODING TIME FOR THE TARGET VIDEO BLOCK

1204

ADJUST A CODING PROCESS FOR THE TARGET VIDEO BLOCK BASED AT LEAST IN PART ON THE PREDICTION OF CODING TIME

1206

PERFORM THE CONVERSION BY USING THE ADJUSTED CODING PROCESS

METHOD, APPARATUS, AND MEDIUM FOR VIDEO PROCESSING

CROSS-REFERENCE TO RELATED APPLICATIONS

This application is a continuation of International Application No. PCT/CN2022/110363, filed on Aug. 4, 2022, which claims the benefit of International Application No. PCT/CN2021/110699 filed on Aug. 5, 2021. The entire contents of these applications are hereby incorporated by reference in their entireties.

FIELD

Embodiments of the present disclosure relates generally to video coding techniques, and more particularly, to coding process adjustment.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of conventional video coding techniques is generally very low, which is undesirable.

SUMMARY

Embodiments of the present disclosure provide a solution for video processing.

In a first aspect, a method for video processing is proposed. The method comprises: determining, during a conversion between a target video block of a video and a bitstream of the video, a prediction of coding time for the target video block, the coding time representing a time duration during which a coding process of the target video block being performed; adjusting the coding process for the target video block based at least in part on the prediction of coding time; and performing the conversion between the target video block and the bitstream by using the adjusted coding process. Compared with the conventional solution, the proposed method can advantageously improve the coding effectiveness and coding efficiency.

In a second aspect, an apparatus for processing video data is proposed. The apparatus for processing video data comprising a processor and a non-transitory memory with instructions theocon, wherein the instructions upon execution by the processor, cause the processor to perform a method in accordance with the first aspect of the present disclosure.

In a third aspect, a non-transitory computer-readable storage medium is proposed. The non-transitory computer-readable storage medium storing instructions that cause a processor to perform a method in accordance with the first aspect of the present disclosure.

In a fourth aspect, another non-transitory computer-readable recording medium is proposed. The non-transitory computer-readable recording medium storing a bitstream of a video which is generated by a method performed by a video processing apparatus, wherein the method comprises: determining, a prediction of encoding time for a target video block of the video, the encoding time representing a time duration during which an encoding process of the target video block being performed; adjusting the encoding process for the target video block based at least in part on the prediction of encoding time; and generating the bitstream by using the adjusted encoding process.

In a fifth aspect, another method for video processing is proposed. The method for storing a bitstream of a video, comprising: determining, a prediction of encoding time for a target video block of the video, the encoding time representing a time duration during which an encoding process of the target video block being performed; adjusting the encoding process for the target video block based at least in part on the prediction of encoding time; generating the bitstream by using the adjusted encoding process; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 8 illustrates an example of calibration CTUs in accordance with some embodiments of the present disclosure;

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
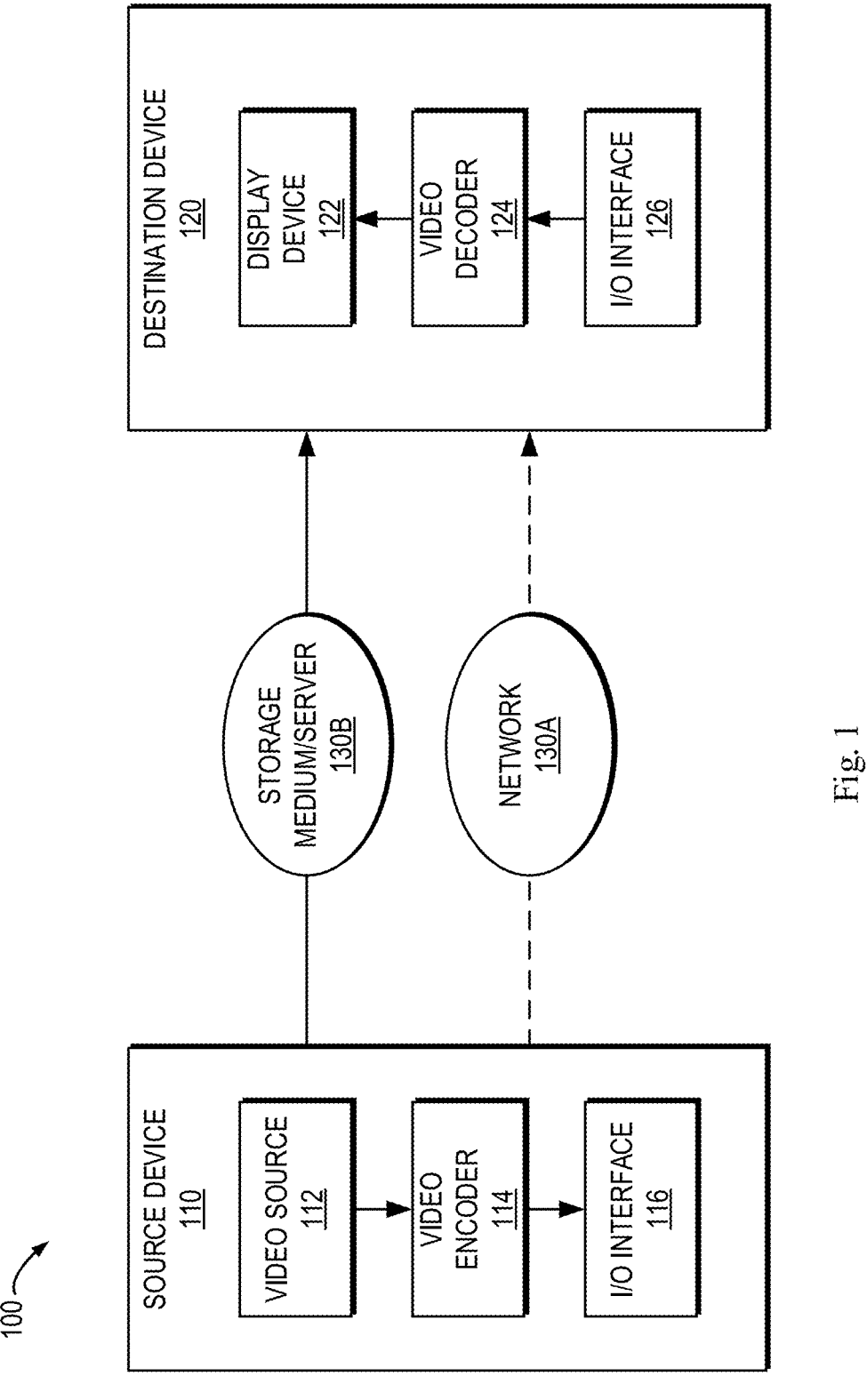
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
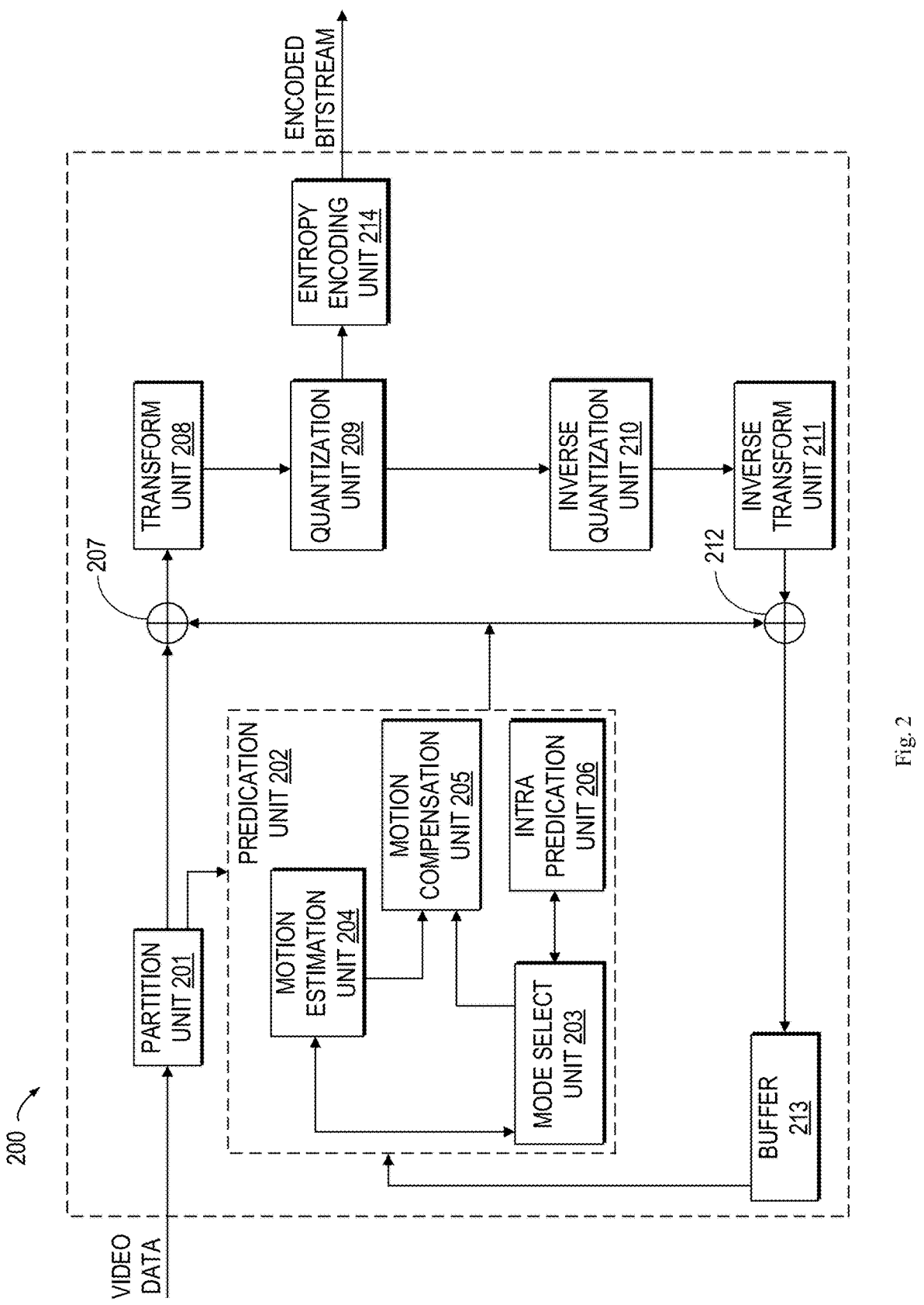
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
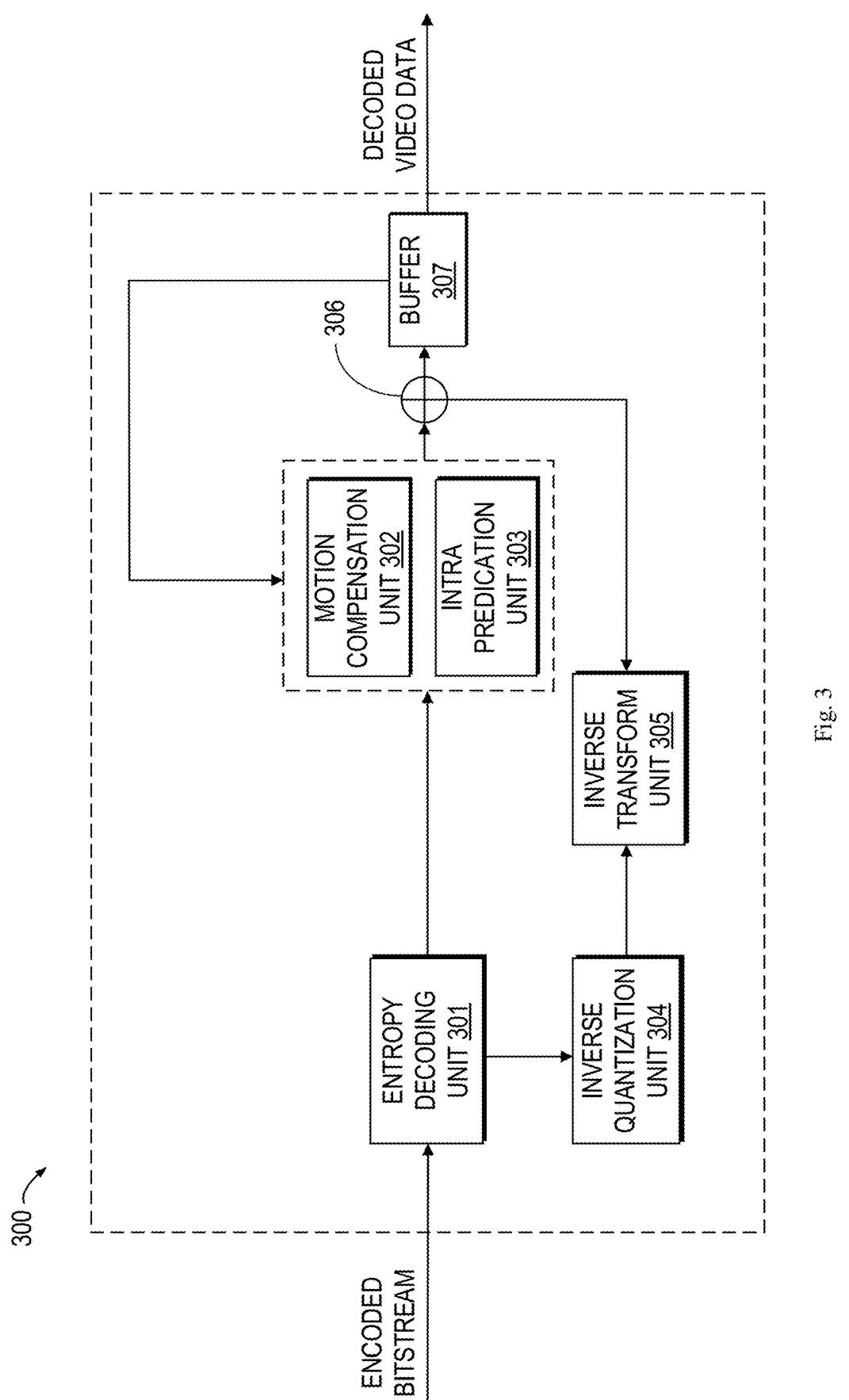
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate case of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

This disclosure is related to video coding technologies. Specifically, it is about encoding time estimation in video coding priors to the encoding process. The ideas may be applied individually or in various combinations, to any video coding standard or non-standard video codec that supports All Intra (AI) setting, e.g., the recently completed Versatile Video Coding (VVC).

2. Abbreviations

AI All Intra
RA Random Access
AVC Advanced Video Coding

HEVC High Efficiency Video Coding
VVC Versatile Video Coding
VCEG Video Coding Experts Group
MPEG Moving Picture Experts Group
SIMD Single Instruction Multiple Data
CTU Coding Tree Unit
VTM VVC Test Model
QP Quantization Parameter
SAD Sum of Absolute Difference
SSE Sum of Squared Error
SVM Support Vector Machine
SVR Support Vector Regression
RMD Rough Mode Decision
RDO Rate-Distortion Optimization

3. Background

Through the development of the well-known ITU-T Video Coding Experts Group (VCEG) and ISO/IEC Moving Picture Experts Group (MPEG), video coding standards have evolved and iterated continuously. Jointly developed by MPEG and VCEG in 1994, 2003, 2013 and 2020, H.262/MPEG-2, H.264/MPEG-4 Advanced Video Coding (AVC), H.265/High Efficiency Video Coding (HEVC) and H.266/Versatile Video Coding (VVC) brings together the most representative technologies of the era. For example, the hybrid video coding structure in H.262, and the continuously renewed coding tools including block partitioning, intra prediction, inter prediction, transform, entropy coding and in-loop filters during the development of AVC, HEVC and VVC. Every ten years, the new generation of video coding standards that integrate the most advanced technologies at the time brought about 50% of bitrate saving. However, more sophisticated algorithm design, for example, more complex Coding Tree Unit (CTU), also led to encoding time several times over. The encoding computational complexity of HEVC is higher than AVC High Profile by a factor of 5. Although Single Instruction Multiple Data (SIMD) is integrated and enabled in VVC, VVC encoding time is still on average 10.2 times higher than HEVC's under Random Access (RA) setting. As for All Intra (AI) setting, the complexity is even increased by a factor of 31. Encoding complexity is gradually becoming a more obvious barrier for wide deployment and use of video coding standards, especially for AI setting. To deal with the problem, complexity reduction is the commonly used method.

Generally, complexity reduction methods rely on artificial designs. Different precalculated values are leveraged as an intermediate feature to determine the modes to be skipped. Wherein the intermediate feature could be pixel-level information such as gradient and variance, or the encoding information such as bits and costs. However, designing acceleration methods based on those intermediate features is not straightforward. Without a pre-analysis and estimation method, only by constructing mode skipping rules, the time saving performance cannot be guaranteed because acceleration strategies could be applied on some CTU with limited encoding time. On the other hand, for some scenarios, namely complexity control scenarios, not only acceleration but also a specific encoding frame rate should be achieved. By using traditional complexity reduction methods, the actual acceleration is only known after encoding, let alone controlling encoding speed to target frame rate. Therefore, a model to estimate encoding time prior to encoding is highly desired. In order to solve the problem, some complexity estimation models of HEVC have been proposed. Relative encoding time of Merge, Inter, and Intra of different CU sizes can be obtained through a statistically constructed lookup table. A model is constructed to estimate the encoding time of the higher depth CUs by the lower depth CUs.

4. Problems

The existing designs for encoding complexity/encoding time estimation have the following problems:
1. The current encoding complexity estimation methods only model the relative complexity, because of which they cannot be directly used for encoding time estimation. CUs of lower depths should be encoded before the estimation of CTU encoding time.
2. The current designs have fixed parameters, which is highly correlated to the encoder and cannot be conveniently extended to encoders of another implementation or standard.
3. The information that could be acquired at the encoding end, for example, pixel-level information and encoding decisions, is not well excavated to realize precise encoding time estimation.
4. Different compiling or running environments could lead to difficulty in the estimation of actual encoding time, which could vary for the same codec.

5. Descriptions

To solve the above problems and some other problems not mentioned, methods as summarized below are disclosed. The embodiments should be considered as examples to explain the general concepts and should not be interpreted in a narrow way. Furthermore, these embodiments can be applied individually or combined in any manner.

1) To solve the first problem, one or more of the following approaches are disclosed:
  a. A video processing unit (e.g., CTU)-based encoding time estimation scheme is exploited, where the encoding time of each video processing unit can be precisely predicted.
    i. In one example, the video processing unit is no smaller than a CTU/CTB, e.g., a CTU row/a sub-region within one picture that covers more than one sample.
    ii. In one example, the video processing unit is smaller than a CTU/CTB, e.g., a VPDU/a sub-region within a CTU/CTB.
    iii. Alternatively, furthermore, the encoding time of a video processing unit or the accumulated Frame/Slice/Tile encoding time could be taken advantage of to guide the design of complexity reduction algorithms.
  In the following descriptions, the video processing unit being a CTU may be used as an example.

2) To solve the second and the third problem, one or more of the following approaches are disclosed:
  a. In one example, a Hadamard cost based model for CTU time estimation is constructed, this method has the least dependency on the encoding process.
    i. Alternatively, furthermore, the CTU may be split to multiple sub-blocks, and the Hadamard cost of each sub-block may be calculated independently.
    ii. Alternatively, furthermore, the model for one CTU time estimation may depend on the Hadamard cost of all or partial of the sub-blocks within one CTU, which is denoted as the CTU cost.
      1. In one example, the sum of all costs of all sub-blocks may be utilized in the model.

b. In one example, an Intra prediction mode cost based model for CTU time estimation is designed. This method has a medium dependency on the encoding process.

i. In one example, the intra prediction rough mode decision (RMD) should include the Planar mode.

1. Alternatively, furthermore, the Planar Cost obtained from the full rate-distortion optimization (RDO) process can be utilized to construct the model.

2. Alternatively, furthermore, the Planar mode of intra process should be executed first, and then CTU time can be estimated using the model.

ii. In one example, more than one intra prediction mode may be utilized in the model.

c. In the above examples, the model may be in the form of an exponential function.

i. In one example, the model may be defined as the $\alpha * \text{CTUcost}^\beta$ wherein $\alpha$ and $\beta$ are two parameters.

ii. In one example, the model may be defined as the $\alpha * \text{CTUcost}^\beta + \gamma$ wherein $\alpha$, $\beta$, $\gamma$ are three parameters.

iii. In one example, at least one of the above mentioned parameters may be pre-defined.

1. In one example, the parameter may be dependent on the coded information, such as slice/picture type, QP, etc. al.

2. Alternatively, the parameter may be updated on the fly.

d. A referable CTUs based CTU time estimation method is designed. This method has the highest dependency on the encoding process.

i. Alternatively, furthermore, the encoding time of the most similar CTU referable to the current CTU is utilized to predict the encoding time of the current CTU.

e. A combination of these CTU time estimation methods may be utilized.

i. In one example, the combination can be artificially designed.

ii. Alternatively, the combination can be carried out by machine learning methods.

3) To solve the fourth problem, one or more of the following approaches are disclosed:

a. A factor reflecting the computing capability is designed for the encoding time estimation correction.

i. In one example, an adaptation process may be carried out intensively at the beginning of the encoding process.

ii. Alternatively, an adaptation process may be carried out gradually along with the coding process.

6. Embodiments

1) Embodiment 1: This Embodiment Describes an Example of how the Hadamard Cost Based CTU Time Estimation Model is Constructed Hadamard cost of the CTU is defined as (1), where 8×8 Hadamard transform is conducted on each subblock of size 8×8. And then the cost of each block is accumulated.

$$Hadcost_{CTU} = \sum_{8\times8 \; blocks \; in \; CTU} HadamardCost(8 \times 8 \; blocks) \qquad (1)$$

Then Hadamard cost of each CTU is utilized to estimate the encoding time of the CTU through the exponential function as (2)

$$\text{Time}_{CTU} = \alpha \times \text{Hadcost}_{CTU}{}^\beta \qquad (2)$$

where alpha and beta are content and QP-related parameters. In one example, these two parameters can be fitted offline. Alternatively, these two parameters can be fitted through the online process. The first one or more CTUs in the current sequence to be coded can be used to fit these parameters. Alternatively, the initial values of these two parameters can be fitted offline, but they update with a definite interval along with the encoding process.

Figure 4:
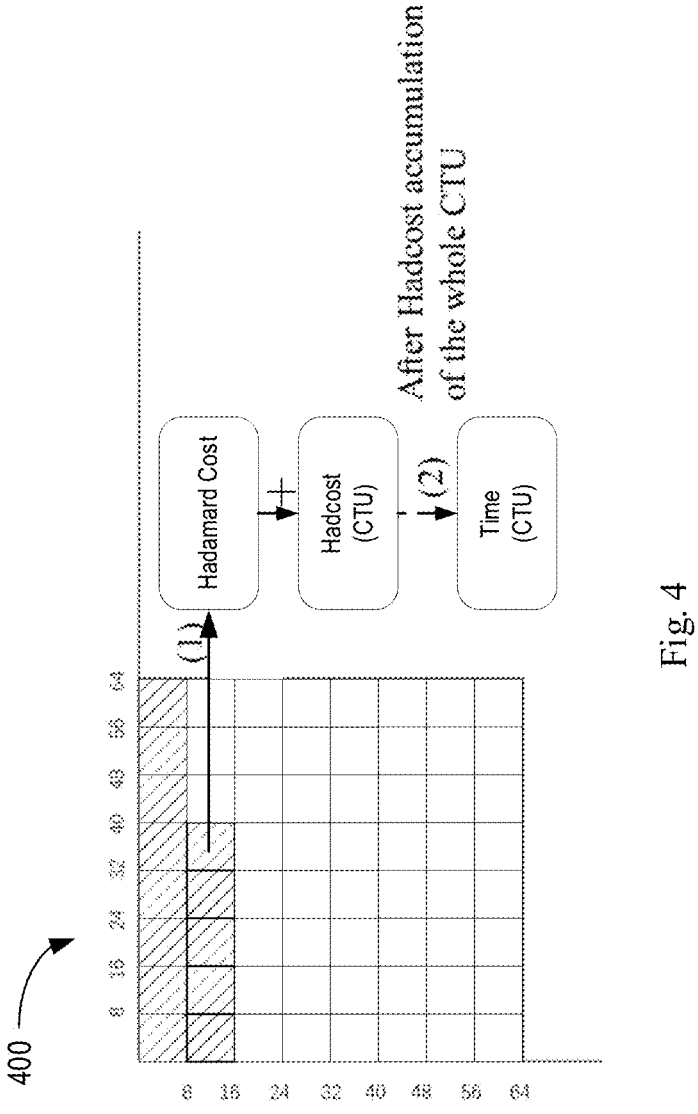
FIG. 4 illustrates a schematic diagram illustrating the Hadamard cost based CTU time estimation in accordance with some embodiments of the present disclosure.

FIG. 4 illustrates a schematic diagram illustrating the Hadamard cost based CTU time estimation in accordance with some embodiments of the present disclosure. The overall Hadamard cost based CTU time estimation procedure 400 is shown in FIG. 4. The Hadamard transform and cost calculation are conducted at each 8×8 block. The only information needed is the pixel values of each 8×8 block for the calculation of Hadamard cost. Therefore, this method can be applied to the whole sequence before the start of encoding.

2) Embodiment 2: This Embodiment Describes an Example of how the Planar Cost Based CTU Time Estimation Model is Constructed Planar cost is defined as the cost of Planar mode acquired after the rough mode decision process in Intra search. Here Planar cost is acquired at the lowest depth available. For example, for video coding standards AVC and HEVC, Intra mode search can be conducted at depth 0. Therefore, Planar cost is also acquired at CTU level (depth 0). But for VVC, Intra mode search of depth 0 is skipped under default configuration. In this case, Planar cost will be obtained after the Intra mode search at 64×64 block. Correspondingly, encoding time prediction will also be conducted at the 64 block level. 64 block will provide more flexibility. By simply adding up the encoding time prediction of four 64 subblocks, the CTU time of VVC can be obtained.

Figure 5:
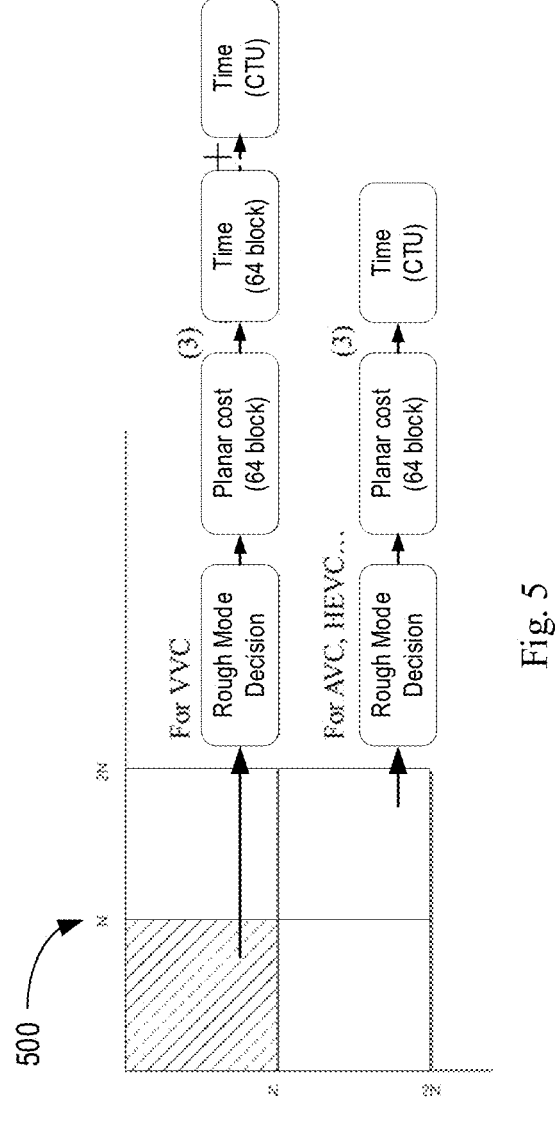
FIG. 5 illustrates a schematic diagram illustrating the Planar cost based CTU time estimation in accordance with some embodiments of the present disclosure.

FIG. 5 demonstrates the procedure 500 of the proposed Planar cost based CTU time estimation method, where 2N represents the CTU width. For VVC, rough mode decision will be executed first, and then Planar cost of each 64 blocks can be obtained. For previous coding standards such as AVC and HEVC, CTU level Planar cost will be obtained. For both situations, an exponential function is exploited to estimate the CTU encoding time with Planar cost as input. For convenience, in function (3), CTU is used to denotes the CTUs and the 64 blocks. The outputs, i.e., estimated CTU time for AVC/HEVC, will be directly used as CTU time estimation. In comparison, 64 block encoding time of VVC will be collected as 64 block time estimation. Alternatively, it can be further utilized to estimate CTU-level encoding time.

$$\text{Time}_{CTU} = \alpha \times \text{Planarcost}_{CTU}{}^\beta \qquad (3)$$

Here, alpha and beta are content and QP-related parameters. In one example, these two parameters can be fitted offline. Alternatively, these two parameters can be fitted through the online process. The first one or more CTUs in the current sequence to be coded can be used to fit these parameters. Alternatively, the initial values of these two parameters can be fitted offline, but they update with a definite interval along with the encoding process.

The dependency on the reconstructed pixels makes the Planar cost not available until the execution of the Intra search of each CTU. Although the dependency prohibited the time estimation of the whole sequence before the actual encoding process, better prediction accuracy makes it suited to other applications. For example, when the encoding process is in progress, the more precise CTU time estimation could help to give online guidance to CTU-level complexity reduction or complexity control.

Figure 6:
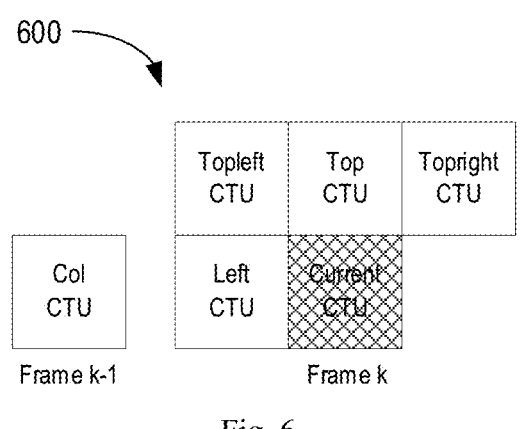
FIG. 6 illustrates example referable CTUs in accordance with some embodiments of the present disclosure.

3) Embodiment 3: This Embodiment Describes an Example of how the Referable CTUs Based CTU Time Estimation Method is Constructed FIG. 6 illustrates example referable CTUs in accordance with some embodiments of the present disclosure. The definition of referable CTUs is the CTUs at the top left, top, top right, left of the current CTU, as well as the collocated CTU in the previous frame, as shown in the diagram 600 of FIG. 6. The top left, top, top right, left CTUs are spatially neighboring CTUs, while the collocated CTU is the temporal neighboring CTU.

The presence of continuity within content in a frame and frames in a sequence produces a correlation between current CTU and the neighboring CTUs. The correlation involves video content and encoding time. Therefore, the encoding times of the neighboring CTUs already encoded are collected as a reference CTU time list. Then the CTU most similar to the current CTU is chosen as (4), whose encoding time is used to estimate the encoding time of the current CTU as (5).

$$CTU_{chosen} = \begin{cases} \text{argmin} SAD(CTU_{curr}, CTU_{ref}) \\ \text{s.t. } CTU_{ref} \in \{topleft, top, topright, left, col\} \end{cases} \quad (4)$$

$$\text{Time}_{CTU} = \text{Time}_{CTUchosen} \quad (5)$$

Here, the similarity is defined as the sum of absolute difference (SAD). Alternatively, it can also be other metrics, for example, sum of squared error (SSE).

The dependency on the previously coded neighboring CTUs makes the method not applicable for CTUs that have no neighboring CTU. On the other hand, when the correlation between the neighboring CTUs and the current CTU is weak, probably encoding time will not be precisely predicted. Nevertheless, for most of the CTUs, a specific encoding time can be referred to instead of an estimated one. This will result in a more precise prediction of the CTU encoding time of the current CTU. Although the dependency and the possible error prohibited the time estimation of the whole sequence, better prediction accuracy of the majority CTUs without computation overhead makes it suitable for use.

4) Embodiment 4: This Embodiment Describes an Example of how the Proposed CTU Time Estimation Methods are Combined Although relative precise encoding time estimation can be achieved by independently adopting the methods as described in Embodiments 1, 2 and 3, these three methods have their own scope. Hadamard cost based method has the least dependency, so it can be conducted at the pre-analysis period. Planar cost, as declared, has a dependency on the previously searched Intra mode. More information provides better estimation accuracy. Referable CTU based method has a dependency on the previously coded CTUs. It can refer to the specific encoding time, because of which the best time estimation can be acquired in the majority of cases. Referable CTU encoding time reflects the complexity of neighboring CTUs, while Hadamard cost and Planar cost reflect the complexity features of the CTU itself.

Figure 7:
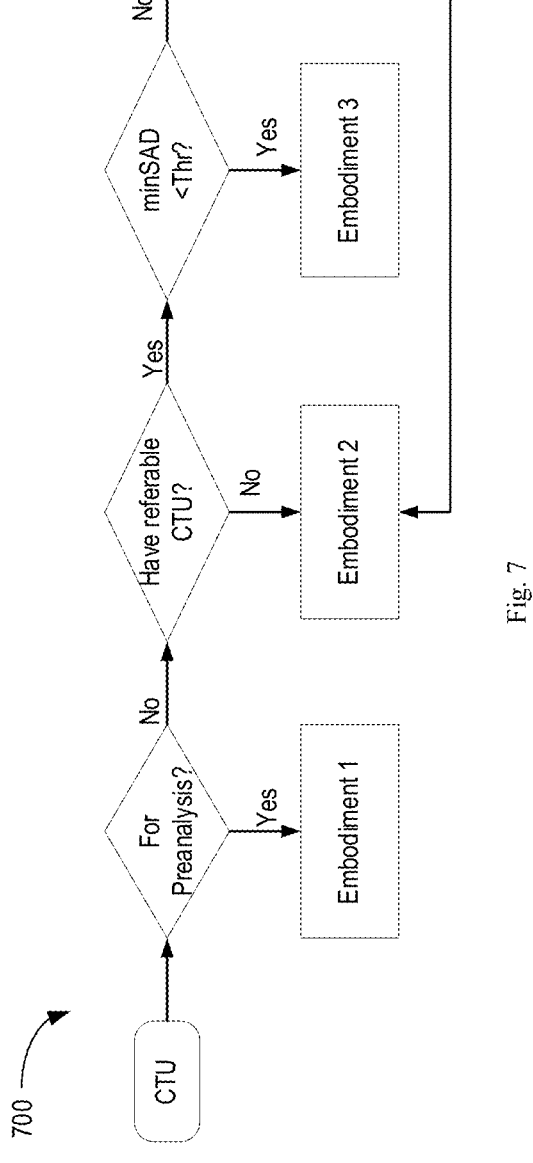
FIG. 7 illustrates a flowchart of a combination of example methods of coding time estimation in accordance with some embodiments of the present disclosure.

However, in some cases, the referable CTU is not similar to the current CTU enough, which will lead to an inaccurate prediction of embodiment 3. In this situation, embodiment 2 can be regarded as a good degradation method. In some situations, pre-analysis is conducted for the full sequence, where Planar cost can not be acquired in advance. Then embodiment 1 is a degradation method. FIG. 7 illustrates a flowchart of a combination of example methods of encoding time estimation in accordance with some embodiments of the present disclosure. This embodiment design a scheme to combine the advantages of these methods, the scheme procedure 700 is shown in FIG. 7.

First, it should be judged whether the time estimation is conducted during the analysis period. If true, the method as described in Embodiment 1 is adopted. Otherwise, the existence of referable CTU is judged. If false, Embodiment 2 is adopted. If a referable CTU exists, then a threshold is designed to judge the minSAD to determine whether the most similar neighboring CTU is similar enough to be regarded as a reference. Assuming the most similar CTU has a SAD smaller than the threshold, then Embodiment 3 is adopted, where the encoding time of the reference CTU is used to estimate the current CTU. If the most similar CTU available still has a SAD larger than the threshold, the scheme will degrade to Embodiment 2. Here, the threshold is defined as a fixed ratio 10% of the maximum SAD. Alternatively, a machine learning-based scheme is designed to combine the features acquired from these three Embodiments. Hadamard cost, Planar cost, minSAD value and corresponding reference CTU encoding time will be drawn as input features of the support vector machine (SVM). Here, Hadamard cost and Planar cost are always available, so their value can be directly utilized. For the outlier CTUs whose reference CTU do no exist, minSAD and reference CTU time will be assigned as −1. One or more features can be utilized, which corresponds to different support vector regressions (SVRs). StandardScaler is utilized for input feature normalization. The SVR is trained with default sklearn parameters, with C=20, epsilon=0.01, gamma=0.1. Alternatively, other SVR parameters can be used.

5) Embodiment 5: This Embodiment Describes an Example of how to Adapt the Estimated CTU Time to Different Compiling and Running Environments Through the methods described in Embodiments 1,2,3,4, an estimated CTU time will be derived. The encoding time is precise, but on the premise of running in an identical environment. In order to make the time predicted wide applicable, a calibration factor is designed as utilized. The calibration factor is fitted during the encoding process, where the actual encoding time and the predicted encoding time are both collected. Then these two collected times are utilized to derive the calibration factor as (6). The average time error described as (7) is also designed to monitor the accuracy status of the model.

$$\text{Factor}_{calibration} = \frac{\sum \text{Time}_{actual}}{\sum \text{Time}_{pred}} \quad (6)$$

-continued $$Time_{error} = \frac{\sum |Time_{actual} - Time_{pred}|}{Num_{codedCTU}} \qquad (7)$$

Figure 8:
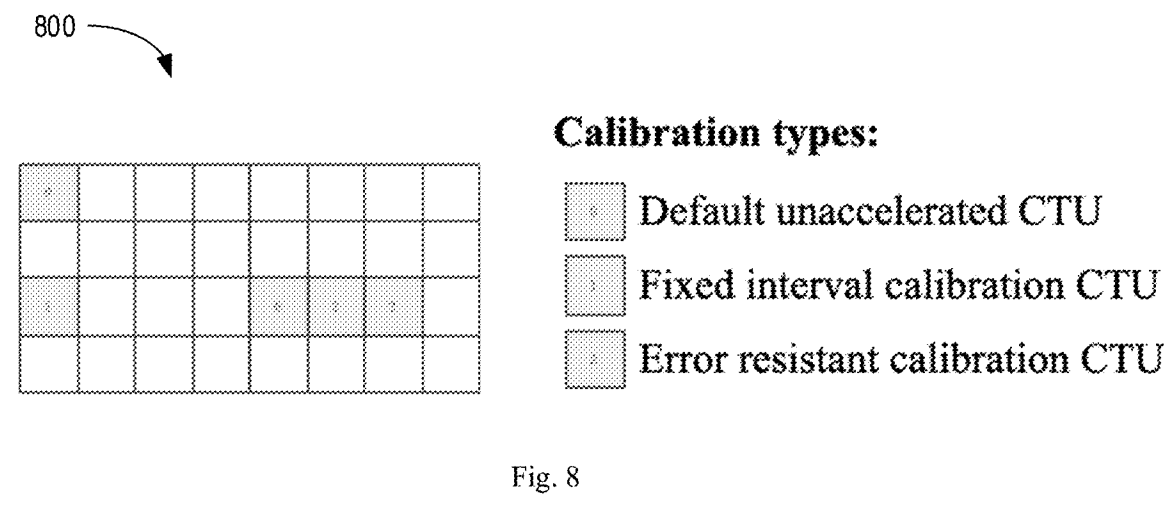

The CTUs used for the calibration process should be kept as the original encoding process. But generally, CTU time estimation is utilized to design some acceleration strategies for the CTUs. Less number of calibration CTU means more acceleration potential, while a higher density of calibration CTU means a more precise estimation of CTU encoding time. Therefore, it's necessary to trade-off between acceleration and the model. FIG. 8 illustrates an example of calibration CTUs. Here a method that decides where to put the calibration CTUs is provided as shown in the diagram 800 in FIG. 8. First, the predicted time and actual time of CTUs that are not accelerated will be automatically collected to calibrate the factors. At the same time, the accumulated prediction error will be used to evaluate the accuracy of the model.

In order to deal with the scarcity of non-accelerated CTU, a fixed number of CTU can be compulsively chosen as calibration CTU for each fixed interval. Here, the interval can be multiple CTUs, one frame, or multiple frames. For example, the first frame of each segment is regarded as the calibration frame.

Here a segment can be a set number of frames. For another example, the first k CTUs in a frame are regarded as the calibration CTUs, where k can be specified artificially. For another example, a CTU for every fixed number of CTUs will be chosen as the calibration CTU.

Further, a fixed number of calibration CTUs can be inserted when the error between the accumulated prediction time and the accumulated actual time exceeds a threshold. Take FIG. 8 as an example, assuming the figure contains 4 rows and 8 columns of CTUs. CTUs marked with 0 are default unaccelerated CTUs, and they can be directly utilized in calibration. Then additional calibration CTUs are artificially appended every two rows, which are marked with 1. In order to further restrain error, CTUs marked with 2 are used for calibration. FIG. 8 gives an example when the error is not suppressed to under threshold, in which case another calibration CTU is compulsively added.

6) Embodiment 6: This Embodiment Illustrates Some of the CTU Time Prediction Results to Prove the Efficiency of the Proposed CTU Time Estimation Methods This embodiment evaluates the efficiency of the proposed CTU encoding time estimation methods. These encoding time estimation methods are implemented in VTM10.0, a reference software of VVC. Four QP values 22, 27, 32, 37 were chosen for compressing all of the sequences from Class C, D, E. The predicted and actual Luma compress time of each 64×64 block are collected for comparison. Here Hadamard cost based method and Planar cost based method can be regarded as cost based methods. Planar cost based method, which has better performance for comparison, may be selected. On the other hand, the referable CTU based method is the reference-based method. Table 1 illustrates the average CTU time prediction error of different methods. Here, the "Combination" method denotes the artificially combined method according to SAD value, while the "Combination-SVM" method denotes the SVM-based combination method, both of which are described in Embodiment 4. According to the Table 1, as low as 14 ms of average CTU time prediction error can be achieved, which is less than 10% of the original encoding time. On the other hand, the referable CTU method has a better prediction accuracy than the Planar cost method. But due to the dependency on the correlation between CTUs, sometimes this method occasionally fails to function. That's the reason the Combination method is better than the referable CTU method. On the other hand, the Combination-SVM method is inferior to the handcrafted Combination method. However, it directly takes Planar Cost as an input, so it's not necessary to fit the exponential function-related parameter for each sequence. A unified SVM parameter makes it possess suitable extensive property, thus more widely applying to different sequences.

TABLE 1

| Comparison of the proposed methods | | | | |
| --- | --- | --- | --- | --- |
| | Average Time Prediction Error (ms) | | | |
| QP | Planar Cost | Referable CTU | Combination | Combination-SVM |
| 22 | 149.90 | 55.07 | 54.89 | 53.95 |
| 27 | 121.06 | 36.42 | 35.85 | 35.80 |
| 32 | 85.91 | 25.24 | 24.08 | 24.80 |
| 37 | 49.39 | 15.23 | 14.13 | 15.07 |

Figure 9:
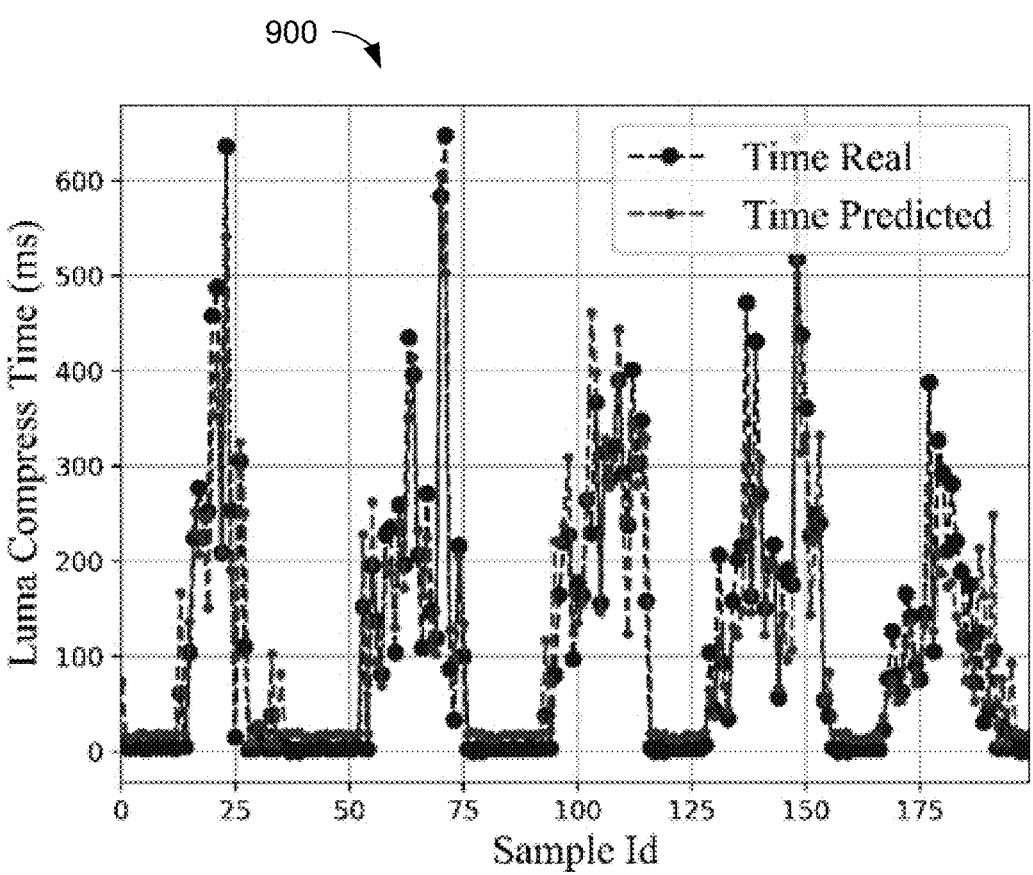
FIG. 9 illustrates an example diagram of CTU time prediction result in accordance with some embodiments of the present disclosure.

FIG. 9 illustrates an example diagram of CTU time prediction result in accordance with some embodiments of the present disclosure. To further demonstrate the accuracy of the proposed methods, the Planar cost based method, which has the lowest accuracy, is adopted. Furthermore, the predicted and actual encoding time of the CTUs in the first frame of Johnny under QP 37 is shown in the diagram 900 of FIG. 9. According to FIG. 9, the actual encoding time can be well traced by the predicted one. If the other proposed methods, which possess better prediction accuracy, are adopted, the actual encoding time will be better traced.

Figure 10A:
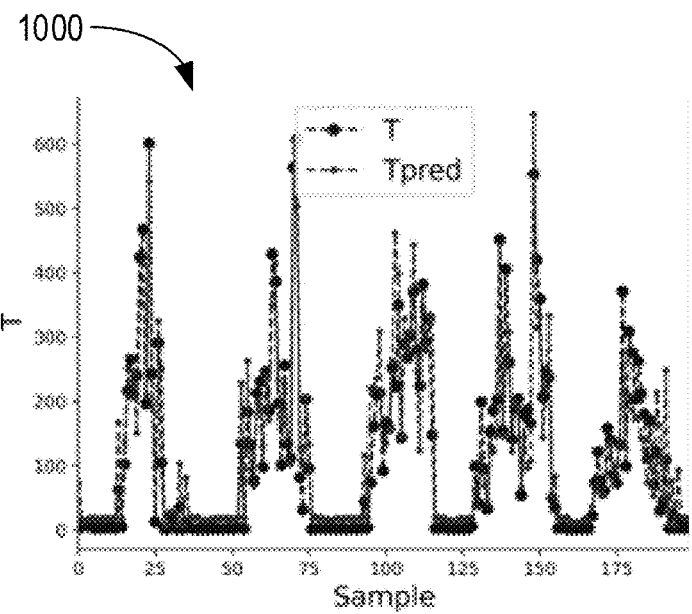
FIGS. 10A-10B illustrates example diagrams of CTU time prediction result without calibration in accordance with some embodiments of the present disclosure.
Figure 10B:
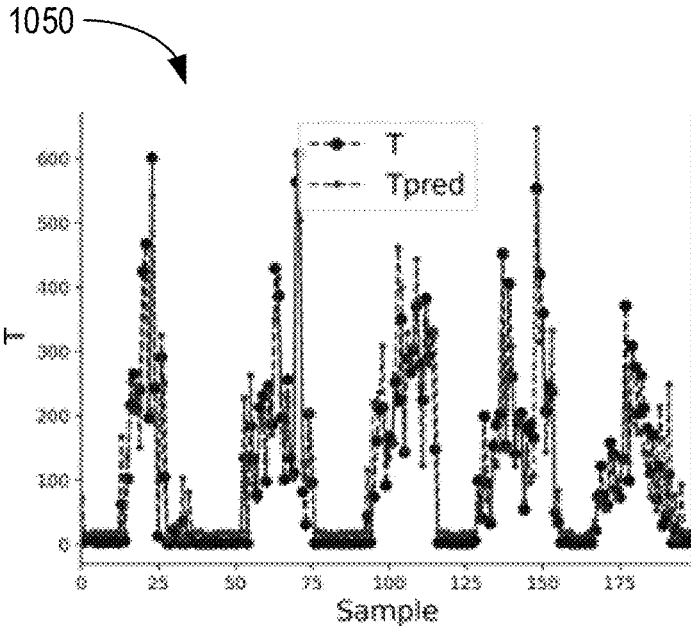
Figure 11:
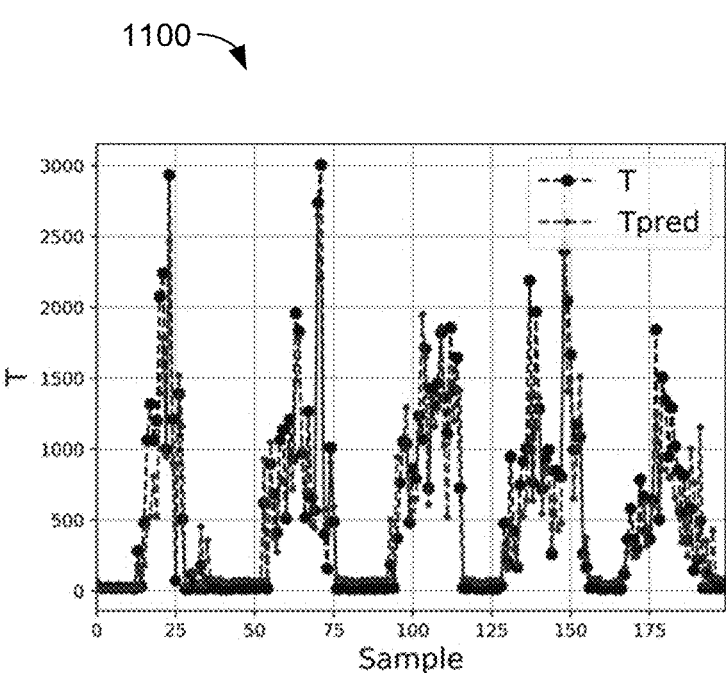
FIG. 11 illustrates an example diagram of CTU time prediction result with calibration in accordance with some embodiments of the present disclosure.

To validate the efficiency of the proposed calibration method as described in Embodiment 5. The fitted parameters in one running environment (Release, ten concurrent processes, marked as A) are directly used in the other (Debug, one concurrent process, marked as B) to see whether the prediction is still precise. Again, the first frame of Johnny under QP 37 is selected for better comparison. FIG. 10A illustrates example diagram 1000 of CTU time prediction result from A to A without calibration in accordance with some embodiments of the present disclosure. FIG. 10B illustrates example diagram 1050 of CTU time prediction result from A to B without calibration in accordance with some embodiments of the present disclosure. FIG. 11 illustrates an example diagram of CTU time prediction result with calibration in accordance with some embodiments of the present disclosure. According to FIGS. 10A-10B, if the parameters are directly utilized, a significant prediction error will appear, and through the calibration method proposed, the prediction becomes accurate again, as shown in the diagram 1100 of FIG. 11. This proves the efficiency of the proposed calibration method.

7. Further Embodiments

The embodiments of the present disclosure are related to encoding time estimation and encoding time adjustment. As used herein, the term "block" may represent a coding block (CB), a coding unit (CU), a prediction unit (PU), a transform unit (TU), a prediction block (PB), a transform block (TB).

Figure 12:
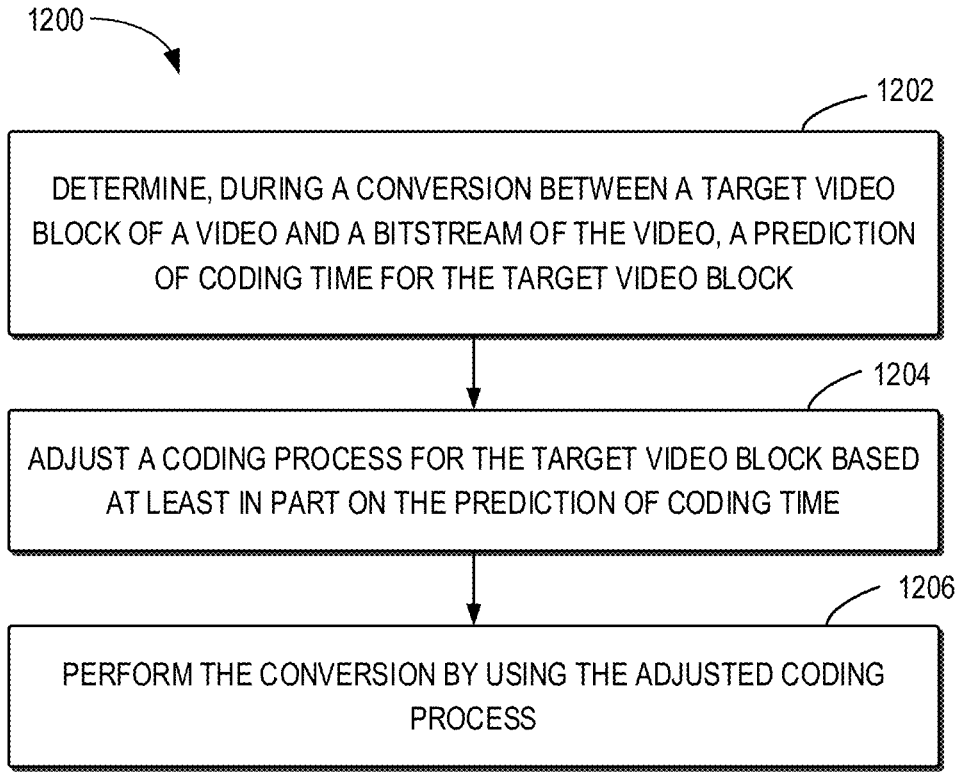
FIG. 12 illustrates a flowchart of a method for video processing in accordance with some embodiments of the present disclosure.

FIG. 12 illustrates a flowchart of a method 1200 for video processing in accordance with some embodiments of the present disclosure. The method 1200 may be implemented during a conversion between a target video block of a video and a bitstream of the video. As shown in FIG. 12, the method 1200 starts at 1202, where a prediction of coding time for the target video block is determined. The coding time represents a time duration during which a coding process of the target video block being performed. As used hereinafter, the term "the target video block" may be also referred to as "the video processing unit".

In some embodiments, the conversion may include encoding the target video block into the bitstream. In such cases, the coding time may comprise an encoding time, and the coding process may comprise an encoding process.

Alternatively, or in addition, the conversion may include decoding the target video block from the bitstream. In such cases, the coding time may comprise a decoding time, and the coding process may comprise a decoding process.

At block 1204, the coding process for the target video block is adjusted based at least in part on the prediction of coding time. As used hereinafter, the adjustment of the coding process may also be referred to as a "complexity reduction process" or "complexity reduction algorithm". At block 1206, the conversion between the target video block and the bitstream is performed. For example, the conversion may be performed by using the adjusted coding process.

According to embodiments of the present disclosure, it is proposed that the coding time for the target video block can be precisely predicted. For example, the coding time for CUs of lower depths can be predicted. In this way, the coding process for the target video block can be adjusted according to the predicted coding time. Such adjusted coding process can be used to improve the effectiveness of the prediction and thus improve the coding efficiency.

In some embodiments, the size of the target video block is equal to a coding tree unit (CTU) or a coding tree block (CTB), or the size of the target video block is bigger than a CTU or a CTB. In other words, the video processing unit or the target video block is no smaller than a CTU/CTB. For example, the target video block may comprise a CTU, a CTU row, or a sub-region within one picture of the video that covers more than one sample.

Alternatively, or in addition, in some embodiments, the size of the target video block is smaller than a coding tree unit (CTU) or a coding tree block (CTB). That is, the video processing unit is smaller than a CTU/CTB. For example, the target video block may comprise a virtual pipeline data unit (VPDU), a sub-region within a CTU or a sub-region within a CTB.

In some embodiment, at block 1204, the coding process may be adjusted based on the prediction of coding time and historical coding time information of the video. For example, the historical coding time information of the video may comprise accumulated frame coding time, accumulated slice coding time, or accumulated tile coding time. In other words, the coding time of a video processing unit (the target video block) and/or the accumulated Frame/Slice/Tile coding time could be taken advantage of to guide the design of complexity reduction algorithms.

In some embodiments, at block 1202, the prediction of coding time may be calculated based on a model for determining a cost of the target video block. For example, the model may comprise a Hadamard cost based model or an intra prediction mode cost based model. Alternatively, in some embodiments, at block 1202, the prediction of coding time may be determined based on a further coding time of a reference video block.

In the example embodiments where a Hadamard cost based model is used to calculate the prediction of coding time, the determination will have the least dependency on the coding process. For example, the target video block may be split into a plurality of sub-blocks. Respective costs for the plurality of sub-blocks may be determined based on the Hadamard cost based model. The prediction of coding time for the target video block may be determined based on costs of the plurality of sub-blocks.

In some embodiments, the prediction of coding time may be based on costs of all of the plurality of sub-blocks or costs of partial of the plurality of sub-blocks within the target video block. For example, the prediction of coding time may be determined based on a sum of the costs of the plurality of sub-blocks. That is, the sum of all costs of all sub-blocks may be utilized in the Hadamard cost based model. The Hadamard cost based model may use the calculation shown in (1) and/or (2) or other suitable calculations. FIG. 4 also illustrates the process of determining the prediction using the Hadamard cost based model.

In those example embodiments where an intra prediction mode cost based model is used in determining the prediction of coding time, the determination will have a medium dependency on the coding process. For example, the intra prediction mode may comprise an intra prediction rough mode decision (RMD). The intra prediction RMD may comprise a Planar mode. For example, the intra prediction mode cost based model may use the calculation shown in (3) or other suitable calculations. FIG. 5 also illustrates the process of determining the prediction using the intra prediction mode cost based model.

In some embodiments, the prediction of coding time may be determined based on a Planar cost obtained from a full rate-distortion optimization (RDO) process. In other words, the Planar cost obtained from the full RDO process can be utilized to construct the model.

Alternatively, or in addition, in some embodiments, the prediction of coding time may be calculated by using the model after a Planar mode of intra process. In other words, the Planar mode of intra process may be executed first, and them CTU time may by estimated using the model.

In some embodiments, the prediction of coding time may be determined by using more than one intra prediction mode. That is, more than one intra prediction mode may be utilized in the model.

In some embodiments, the model is in a form of an exponential metric. For example, the exponential metric comprises a plurality of parameters. In some embodiments, at least one of the plurality of parameters is pre-defined. Alternatively, or in addition, in some embodiments, at least one of the plurality of parameters depends on coded information. For example, the coded information may comprise: a slice type, a picture type, or a quantization parameter (QP).

Alternatively, or in addition, in some cases, at least one of the plurality of parameters is updated during a conversion between the video and the bitstream. That is to say, at least one of the plurality of parameters may be updated on the fly.

In some embodiments, the exponential metric or the exponential function may be $\alpha*CTUcost^\beta$, where a represents a weighting parameter, CTUcost represents a cost of the target video block, and $\beta$ represents an exponential parameter. Alternatively, in some embodiments, the exponential metric may be $\alpha*CTUcost^\beta+\gamma$, where $\alpha$ represents a weighting parameter, CTUcost represents a cost of the target video block, $\beta$ represents an exponential parameter, and $\gamma$ represents an offset parameter.

In some embodiments, at block 1202, the prediction of coding time may be determined based on the further coding time of the reference video block. Such method may be referred to as a referable CTUs based CTU time estimation method, which has the highest dependency on the coding process. FIG. 6 shows examples of referable CTUS.

In some embodiments, the reference video block may be determined from a plurality of neighboring video blocks based on similarities between the plurality of neighboring video blocks and the target video block. The prediction of coding time may be determined based on the further coding time of the reference video block. The similarity between the reference video block and the target video block may be above a threshold. In other words, the coding time of the most similar CTU referable to the target video block (for example, the current CTU) may be utilized to predict the coding time of the target video block.

Alternatively, or in addition, in some embodiments, at block 1202, the prediction of coding time may be determined by a combination of the following: a Hadamard cost based model, an intra prediction mode cost based model, and a further coding time of a reference video block. For example, the combination may be artificially designed. Alternatively, the combination may be determined based on a machine learning process. FIG. 7 illustrates an example combination of several coding time prediction methods in accordance with the present disclosure. It is to be understood that the example shown in FIG. 7 is only for the purpose of illustration, without suggesting any limitations. The proposed methods and any other suitable methods according to the present disclosure can be combined in any suitable way.

By determining the prediction of coding time for the target video block, such complexity reduction process can be flexibly conducted. Such complexity reduction process may be conveniently extended to encoders of other implementation or standard.

In some embodiments, the prediction of coding time may be further adjusted. For example, an adjusting factor may be determined based on a computing capability. The prediction of coding time may be adjusted based on the adjusting factor. In other words, a factor reflecting the computing capability is designed for the coding time estimation correction. In some embodiments, the adjusting is performed at a beginning of a coding process for the video. That is, the adaptation process may be carried out intensively at the beginning of the coding process. Alternatively, the adjusting is preformed along with a conversion between the video and the bitstream. In other words, the adaptation process may be carried out gradually along with the coding process.

By adjusting the prediction of coding time based on the computing capability, the present coding time estimation may be applied in different compiling or running environments.

In some embodiments, a bitstream of a video may be stored in a non-transitory computer-readable recording medium. The bitstream of the video can be generated by a method performed by a video processing apparatus. According to the method, a prediction of coding time for the target video block is determined. The c represents a time duration during which an encoding process of the target video block being performed. The encoding process for the target video block is adjusted based at least in part on the prediction of encoding time. A bitstream of the target video block may be generated by using the adjusted encoding process.

In some embodiments, a prediction of encoding time for the target video block is determined. The encoding time represents a time duration during which an encoding process of the target video block being performed. The encoding process for the target video block is adjusted based at least in part on the prediction of encoding time. A bitstream of the target video block may be generated by using the adjusted encoding process. The bitstream may be stored in a non-transitory computer-readable recording medium.

Implementations of the present disclosure can be described in view of the following clauses, the features of which can be combined in any reasonable manner.

Clause 1. A method for video processing, comprising: determining, during a conversion between a target video block of a video and a bitstream of the video, a prediction of coding time for the target video block, the coding time representing a time duration during which a coding process of the target video block being performed; adjusting the coding process for the target video block based at least in part on the prediction of coding time; and performing the conversion between the target video block and the bitstream by using the adjusted coding process.

Clause 2. The method of clause 1, wherein the size of the target video block is equal to a coding tree unit (CTU) or a coding tree block (CTB), or the size of the target video block is bigger than a CTU or a CTB.

Clause 3. The method of clause 2, wherein the target video block comprises one of: a CTU, a CTU row, or a sub-region within one picture of the video that covers more than one sample.

Clause 4. The method of clause 1, wherein the size of the target video block is smaller than a coding tree unit (CTU) or a coding tree block (CTB).

Clause 5. The method of clause 4, wherein the target video block comprises one of: a virtual pipeline data unit (VPDU), a sub-region within a CTU or a sub-region within a CTB.

Clause 6. The method of any of clauses 1-5, wherein adjusting the coding process comprises: adjusting the coding process based on the prediction of coding time and historical coding time information of the video.

Clause 7. The method of clause 6, wherein the historical coding time information of the video comprises one of: accumulated frame coding time, accumulated slice coding time, or accumulated tile coding time.

Clause 8. The method of any of clauses 1-7, wherein determining the prediction of coding time comprises at least one of: calculating the prediction of coding time based on a model for determining a cost of the target video block; or determining the prediction of coding time based on a further coding time of a reference video block.

Clause 9. The method of clause 8, wherein the model comprises a Hadamard cost based model.

Clause 10. The method of clause 9, wherein calculating the prediction of coding time comprises: splitting the target video block into a plurality of sub-blocks; calculating a respective cost for each of the plurality of sub-blocks based on the model; and determining the prediction of coding time based on costs of the plurality of sub-blocks.

Clause 11. The method of clause 10, wherein determining the prediction of coding time based on costs of the plurality of sub-blocks comprises: determining the prediction of coding time based on costs of all of the plurality of sub-blocks or costs of partial of the plurality of sub-blocks within the target video block.

Clause 12. The method of clause 10 or clause 11, wherein determining the prediction of coding time based on costs of the plurality of sub-blocks comprises: determining the prediction of coding time based on a sum of the costs of the plurality of sub-blocks.

Clause 13. The method of clause 8, wherein the model comprises an intra prediction mode cost based model.

Clause 14. The method of clause 13, wherein the intra prediction mode comprises an intra prediction rough mode decision (RMD).

Clause 15. The method of clause 14, wherein the intra prediction RMD comprises a Planar mode.

Clause 16. The method of any of clauses 13-15, wherein calculating the prediction of coding time based on the model comprises: determining the prediction of coding time based on a Planar cost obtained from a full rate-distortion optimization (RDO) process.

Clause 17. The method of any of clauses 13-15, wherein calculating the prediction of coding time comprises: calculating the prediction of coding time by using the model after a Planar mode of intra process.

Clause 18. The method of any of clauses 13-17, wherein calculating the prediction of coding time based on the model comprises: calculating the prediction of coding time by using more than one intra prediction mode.

Clause 19. The method of any of clauses 8-18, wherein the model is in a form of an exponential metric.

Clause 20. The method of clause 19, wherein the exponential metric comprises a plurality of parameters.

Clause 21. The method of clause 20, wherein at least one of the plurality of parameters is pre-defined.

Clause 22. The method of clause 20, wherein at least one of the plurality of parameters depends on coded information.

Clause 23. The method of clause 22, wherein the coded information comprises at least one of: a slice type, a picture type, or a quantization parameter (QP).

Clause 24. The method of clause 20, wherein at least one of the plurality of parameters is updated during a further conversion between the video and the bitstream.

Clause 25. The method of any of clauses 19-24, wherein the exponential metric comprises one of: $\alpha*CTUcost^{\beta}$, where $\alpha$ represents a weighting parameter, CTUcost represents a cost of the target video block, and $\beta$ represents an exponential parameter, or $\alpha*CTUcost^{\beta}+\gamma$, where $\alpha$ represents a weighting parameter, CTUcost represents a cost of the target video block, $\beta$ represents an exponential parameter, and $\gamma$ represents an offset parameter.

Clause 26. The method of clause 8, wherein determining the prediction of coding time based on the further coding time of the reference video block comprises: determining the reference video block from a plurality of neighboring video blocks based on similarities between the plurality of neighboring video blocks and the target video block; and determining the prediction of coding time based on the further coding time of the reference video block.

Clause 27. The method of clause 26, wherein a similarity between the reference video block and the target video block is above a threshold.

Clause 28. The method of any of clauses 1-8, wherein determining the prediction of coding time for the target video block comprises: determining the prediction of coding time by using a combination of the following: a Hadamard cost based model, an intra prediction mode cost based model, and a further coding time of a reference video block.

Clause 29. The method of clause 28, wherein the Hadamard cost based model has a less dependency on a coding process for the target video block than the intra prediction mode cost based model, and wherein the intra prediction mode cost based model has a less dependency on the coding process than the further coding time of the reference video block.

Clause 30. The method of clause 28 or clause 29, wherein the combination is artificially designed.

Clause 31. The method of any of clauses 28-30, wherein the combination is determined based on a machine learning process.

Clause 32. The method of any of clauses 1-31, wherein determining the prediction of coding time comprises: determining an adjusting factor based on a computing capability; and adjusting the prediction of coding time for the target video block based on the adjusting factor.

Clause 33. The method of clause 32, wherein the adjusting is performed at a beginning of a coding process for the video.

Clause 34. The method of clause 32, wherein the adjusting is preformed along with a further conversion between the video and the bitstream.

Clause 35. The method of any of clauses 1-34, wherein the conversion includes encoding the target video block into the bitstream.

Clause 35. The method of clause 35, wherein the coding time comprises an encoding time, and the coding process comprises an encoding process.

Clause 37. The method of any of clauses 1-34, wherein the conversion includes decoding the target video block from the bitstream.

Clause 38. The method of clause 37, wherein the coding time comprises a decoding time, and the coding process comprises a decoding process.

Clause 39. An apparatus for processing video data comprising a processor and a non-transitory memory with instructions thereon, wherein the instructions upon execution by the processor, cause the processor to perform a method in accordance with any of Clauses 1-38.

Clause 40. A non-transitory computer-readable storage medium storing instructions that cause a processor to perform a method in accordance with any of Clauses 1-38.

Clause 41. A non-transitory computer-readable recording medium storing a bitstream of a video which is generated by a method performed by a video processing apparatus, wherein the method comprises: determining, a prediction of encoding time for a target video block of the video, the encoding time representing a time duration during which an encoding process of the target video block being performed; adjusting the encoding process for the target video block based at least in part on the prediction of encoding time; and generating the bitstream by using the adjusted encoding process.

Clause 42. A method for storing a bitstream of a video, comprising: determining, a prediction of encoding time for a target video block of the video, the encoding time representing a time duration during which an encoding process of the target video block being performed; adjusting the encoding process for the target video block based at least in part on the prediction of encoding time; generating the bitstream by using the adjusted encoding process; and storing the bitstream in a non-transitory computer-readable recording medium.

Example Device

Figure 13:
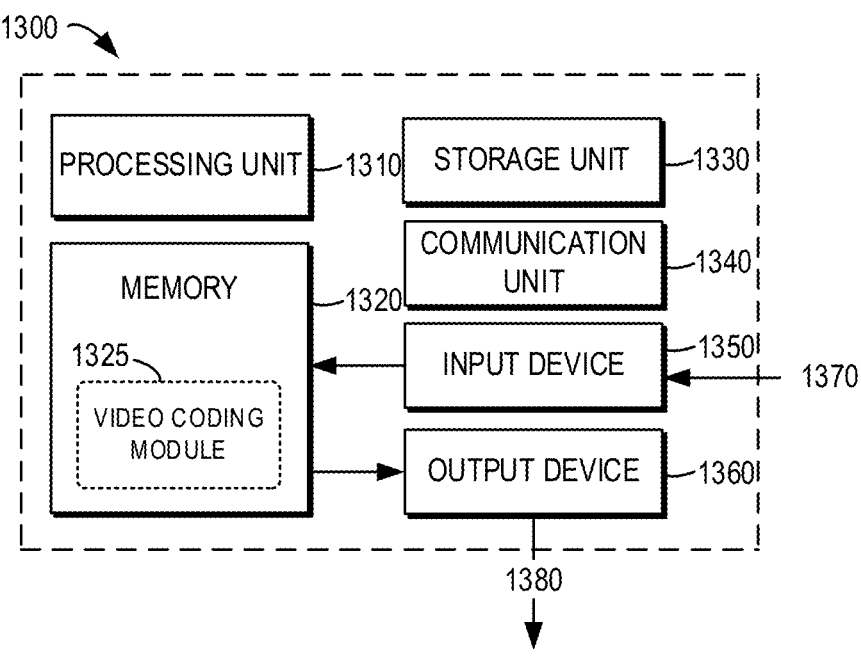
FIG. 13 illustrates a block diagram of a computing device in which various embodiments of the present disclosure can be implemented.

FIG. 13 illustrates a block diagram of a computing device 1300 in which various embodiments of the present disclosure can be implemented. The computing device 1300 may be implemented as or included in the source device 110 (or the video encoder 114 or 200) or the destination device 120 (or the video decoder 124 or 300).

It would be appreciated that the computing device 1300 shown in FIG. 13 is merely for purpose of illustration, without suggesting any limitation to the functions and scopes of the embodiments of the present disclosure in any manner.

As shown in FIG. 13, the computing device 1300 includes a general-purpose computing device 1300. The computing device 1300 may at least comprise one or more processors or processing units 1310, a memory 1320, a storage unit 1330, one or more communication units 1340, one or more input devices 1350, and one or more output devices 1360.

In some embodiments, the computing device 1300 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/ video player, digital camera/video camera, positioning device, television receiver, radio broadcast receiver, E-book device, gaming device, or any combination thereof, including the accessories and peripherals of these devices, or any combination thereof. It would be contemplated that the computing device 1300 can support any type of interface to a user (such as "wearable" circuitry and the like).

The processing unit 1310 may be a physical or virtual processor and can implement various processes based on programs stored in the memory 1320. In a multi-processor system, multiple processing units execute computer executable instructions in parallel so as to improve the parallel processing capability of the computing device 1300. The processing unit 1310 may also be referred to as a central processing unit (CPU), a microprocessor, a controller or a microcontroller.

The computing device 1300 typically includes various computer storage medium. Such medium can be any medium accessible by the computing device 1300, including, but not limited to, volatile and non-volatile medium, or detachable and non-detachable medium. The memory 1320 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1330 may be any detachable or non-detachable medium and may include a machine-readable medium such as a memory, flash memory drive, magnetic disk or another other media, which can be used for storing information and/or data and can be accessed in the computing device 1300.

The computing device 1300 may further include additional detachable/non-detachable, volatile/non-volatile memory medium. Although not shown in FIG. 13, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1340 communicates with a further computing device via the communication medium. In addition, the functions of the components in the computing device 1300 can be implemented by a single computing cluster or multiple computing machines that can communicate via communication connections. Therefore, the computing device 1300 can operate in a networked environment using a logical connection with one or more other servers, networked personal computers (PCs) or further general network nodes.

The input device 1350 may be one or more of a variety of input devices, such as a mouse, keyboard, tracking ball, voice-input device, and the like. The output device 1360 may be one or more of a variety of output devices, such as a display, loudspeaker, printer, and the like. By means of the communication unit 1340, the computing device 1300 can further communicate with one or more external devices (not shown) such as the storage devices and display device, with one or more devices enabling the user to interact with the computing device 1300, or any devices (such as a network card, a modem and the like) enabling the computing device 1300 to communicate with one or more other computing devices, if required. Such communication can be performed via input/output (I/O) interfaces (not shown).

In some embodiments, instead of being integrated in a single device, some or all components of the computing device 1300 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 1300 may be used to implement video encoding/decoding in embodiments of the present disclosure. The memory 1320 may include one or more video coding modules 1325 having one or more program instructions. These modules are accessible and executable by the processing unit 1310 to perform the functionalities of the various embodiments described herein.

In the example embodiments of performing video encoding, the input device 1350 may receive video data as an input 1370 to be encoded. The video data may be processed, for example, by the video coding module 1325, to generate an encoded bitstream. The encoded bitstream may be provided via the output device 1360 as an output 1380.

In the example embodiments of performing video decoding, the input device 1350 may receive an encoded bitstream as the input 1370. The encoded bitstream may be processed, for example, by the video coding module 1325, to generate decoded video data. The decoded video data may be provided via the output device 1360 as the output 1380.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:

determining, during a conversion between a target video block of a video and a bitstream of the video, a prediction of coding time for the target video block based on at least one of: a cost of the target video block, or a reference coding time of a reference video block different from the target video block, the coding time representing a time duration during which a coding process of the target video block being performed;

adjusting the coding process for the target video block based at least in part on the prediction of coding time; and performing the conversion between the target video block and the bitstream by using the adjusted coding process, wherein determining the prediction of coding time based on the reference coding time of the reference video block comprises:

determining the reference video block from a plurality of candidate video blocks associated with the target video block based on similarities between the plurality of candidate video blocks and the target video block, the plurality of candidate video blocks comprising at least one neighboring video block of the target video block and a collocated block of the target video block; and determining the prediction of coding time based on the reference coding time of the reference video block.

2. The method of claim 1, wherein the size of the target video block is equal to a coding tree unit (CTU) or a coding tree block (CTB), or the size of the target video block is bigger than a CTU or a CTB, or wherein the size of the target video block is smaller than a coding tree unit (CTU) or a coding tree block (CTB), or wherein adjusting the coding process comprises: adjusting the coding process based on the prediction of coding time and historical coding time information of the video.

3. The method of claim 1, wherein the cost of the target video block is determined by a model.

4. The method of claim 3, wherein the model comprises a Hadamard cost based model.

5. The method of claim 4, wherein calculating the prediction of coding time comprises:

splitting the target video block into a plurality of sub-blocks;

calculating a respective cost for each of the plurality of sub-blocks based on the model; and determining the prediction of coding time based on costs of the plurality of sub-blocks.

6. The method of claim 5, wherein determining the prediction of coding time based on costs of the plurality of sub-blocks comprises: determining the prediction of coding time based on costs of all of the plurality of sub-blocks or costs of partial of the plurality of sub-blocks within the target video block, or wherein determining the prediction of coding time based on costs of the plurality of sub-blocks comprises: determining the prediction of coding time based on a sum of the costs of the plurality of sub-blocks.

7. The method of claim 3, wherein the model comprises an intra prediction mode cost based model.

8. The method of claim 7, wherein the intra prediction mode comprises an intra prediction rough mode decision (RMD), or wherein calculating the prediction of coding time based on the model comprises: determining the prediction of coding time based on a Planar cost obtained from a full rate-distortion optimization (RDO) process, or wherein calculating the prediction of coding time comprises: calculating the prediction of coding time by using the model after a Planar mode of intra process, or wherein calculating the prediction of coding time based on the model comprises: calculating the prediction of coding time by using more than one intra prediction mode.

9. The method of claim 3, wherein the model is in a form of an exponential metric.

10. The method of claim 9, wherein the exponential metric comprises a plurality of parameters.

11. The method of claim 10, wherein at least one of the plurality of parameters is pre-defined, or wherein at least one of the plurality of parameters depends on coded information, or wherein at least one of the plurality of parameters is updated during a further conversion between the video and the bitstream.

12. The method of claim 1, wherein determining the prediction of coding time for the target video block comprises:

determining the prediction of coding time by using a combination of the following:

a Hadamard cost based model, an intra prediction mode cost based model, and the reference coding time of the reference video block.

13. The method of claim 12, wherein the Hadamard cost based model has a less dependency on a coding process for the target video block than the intra prediction mode cost based model, and wherein the intra prediction mode cost based model has a less dependency on the coding process than the reference coding time of the reference video block, or wherein the combination is artificially designed, or wherein the combination is determined based on a machine learning process.

14. The method of claim 1, wherein determining the prediction of coding time comprises:

determining an adjusting factor based on a computing capability; and adjusting the prediction of coding time for the target video block based on the adjusting factor.

15. The method of claim 14, wherein the adjusting is performed at a beginning of a coding process for the video, or wherein the adjusting is preformed along with a further conversion between the video and the bitstream.

16. The method of claim 1, wherein the conversion includes encoding the target video block into the bitstream, or wherein the conversion includes decoding the target video block from the bitstream.

17. An apparatus for processing video data comprising a processor and a non-transitory memory with instructions thereon, wherein the instructions upon execution by the processor, cause the processor to perform acts comprising:

determining, during a conversion between a target video block of a video and a bitstream of the video, a prediction of coding time for the target video block 5 based on at least one of: a cost of the target video block, or a reference coding time of a reference video block different from the target video block, the coding time representing a time duration during which a coding process of the target video block being performed; 10 adjusting the coding process for the target video block based at least in part on the prediction of coding time; and performing the conversion between the target video block and the bitstream by using the adjusted coding process, 15 wherein determining the prediction of coding time based on the reference coding time of the reference video block comprises:

determining the reference video block from a plurality of candidate video blocks associated with the target video 20 block based on similarities between the plurality of candidate video blocks and the target video block, the plurality of candidate video blocks comprising at least one neighboring video block of the target video block and a collocated block of the target video block; and 25 determining the prediction of coding time based on the reference coding time of the reference video block.

18. A non-transitory computer-readable storage medium storing instructions that cause a processor to perform acts comprising: 30 determining, during a conversion between a target video block of a video and a bitstream of the video, a prediction of coding time for the target video block based on at least one of: a cost of the target video block, or a reference coding time of a reference video block 35 different from the target video block, the coding time representing a time duration during which a coding process of the target video block being performed;

adjusting the coding process for the target video block based at least in part on the prediction of coding time; 40 and performing the conversion between the target video block and the bitstream by using the adjusted coding process, wherein determining the prediction of coding time based on the reference coding time of the reference video block comprises:

determining the reference video block from a plurality of candidate video blocks associated with the target video block based on similarities between the plurality of candidate video blocks and the target video block, the plurality of candidate video blocks comprising at least one neighboring video block of the target video block and a collocated block of the target video block; and determining the prediction of coding time based on the reference coding time of the reference video block.

19. A non-transitory computer-readable recording medium storing a bitstream of a video which is generated by a method performed by a video processing apparatus, wherein the method comprises:

determining-a prediction of encoding time for a target video block of the video based on at least one of: a cost of the target video block, or a reference coding time of a reference video block different from the target video block, the encoding time representing a time duration during which an encoding process of the target video block being performed;

adjusting the encoding process for the target video block based at least in part on the prediction of encoding time; and generating the bitstream by using the adjusted encoding process, wherein determining the prediction of coding time based on the reference coding time of the reference video block comprises:

determining the reference video block from a plurality of candidate video blocks associated with the target video block based on similarities between the plurality of candidate video blocks and the target video block, the plurality of candidate video blocks comprising at least one neighboring video block of the target video block and a collocated block of the target video block; and determining the prediction of coding time based on the reference coding time of the reference video block.

* * * * *